June 14, 1927.

E. ANDERSON

GAS SCRUBBER

Filed May 26, 1924    3 Sheets-Sheet 1

INVENTOR.
Evald Anderson
BY
Arthur P. Knight
ATTORNEY.

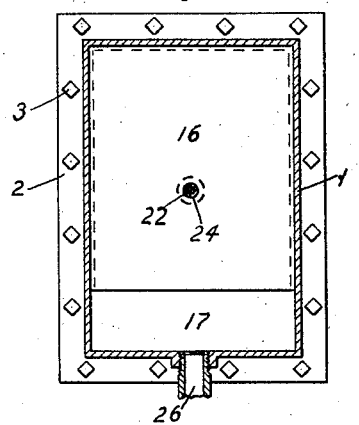
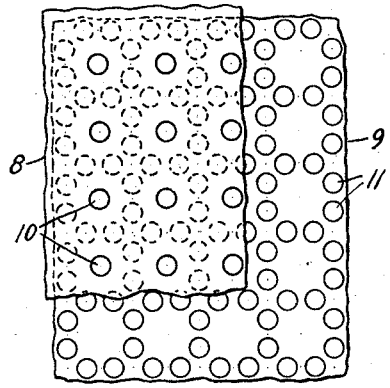
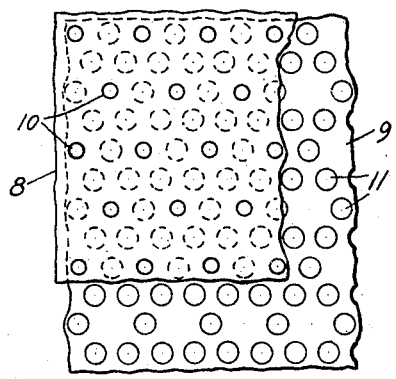
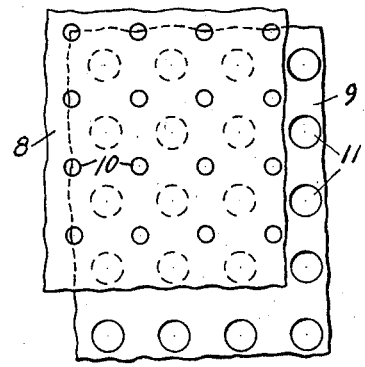
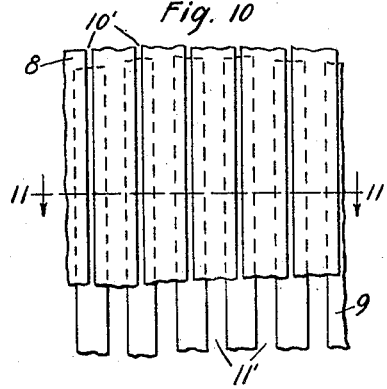
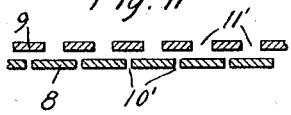
INVENTOR.
Evald Anderson
BY
ATTORNEY.

June 14, 1927.
E. ANDERSON
1,632,325
GAS SCRUBBER
Filed May 26, 1924
3 Sheets-Sheet 3
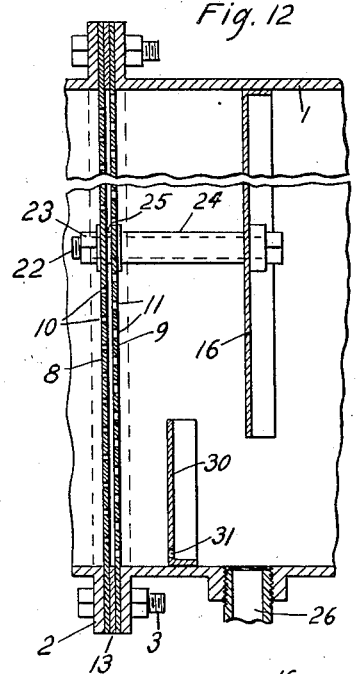
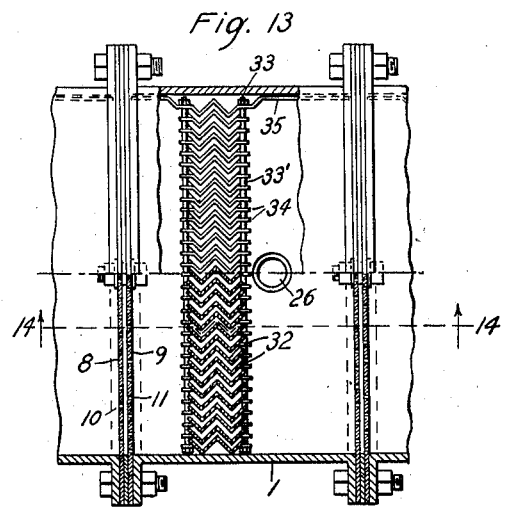
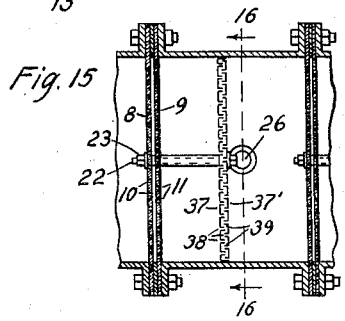
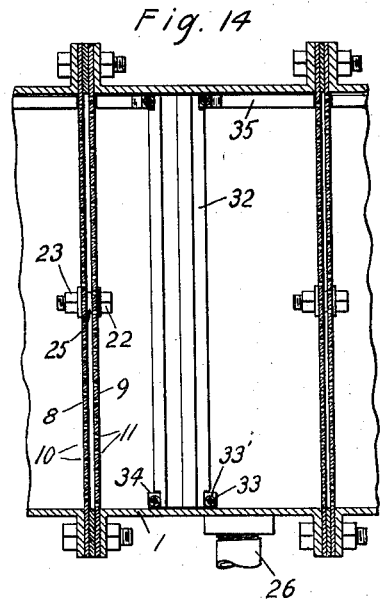
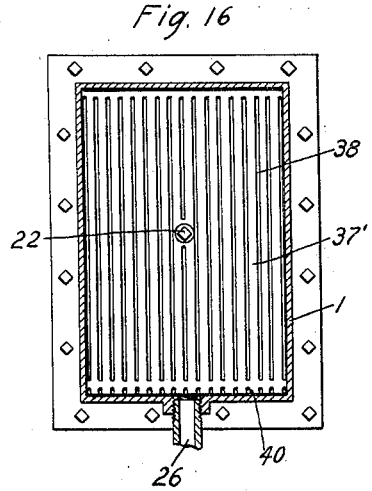
INVENTOR.
Evald Anderson
BY *Arthur P. Knight*
ATTORNEY.

Patented June 14, 1927.

1,632,325

UNITED STATES PATENT OFFICE.

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA.

GAS SCRUBBER.

Application filed May 26, 1924. Serial No. 715,877.

This invention relates to apparatus for scrubbing or cleaning gases or vapors to remove liquid particles or mist therefrom and is applicable for example to cleaning or scrubbing of gas bearing acid mist, resulting from the operation of acid concentration processes, or for other purposes.

The main object of the present invention is to provide a gas scrubber of simple and economical construction which will be efficient in operation.

The accompanying drawings illustrate embodiments of my invention and referring thereto:

Fig. 1 is a longitudinal vertical section of the scrubber.

Fig. 2 is a section on line 2—2 in Fig. 1.
Fig. 3 is a section on line 3—3 in Fig. 1.
Fig. 4 is a section on line 4—4 in Fig. 1.
Fig. 5 is a section on line 5—5 in Fig. 3.
Fig. 6 is a section on line 6—6 in Fig. 1.

Fig. 7 is a detail front view of a pair of scrubber plates, the first plate being partly broken away.

Figs. 8 to 10 are views similar to Fig. 7, showing modified forms of scrubber plates.

Fig. 11 is a section on line 11—11 in Fig. 10.

Fig. 12 is a longitudinal vertical section of one unit of a modified form of scrubber.

Fig. 13 is a horizontal section of one unit of a scrubber with a modified form of eliminating means.

Fig. 14 is a section on line 14—14 in Fig. 13.

Fig. 15 is a horizontal section of one unit of a scrubber with another modification of the eliminating means.

Fig. 16 is a section on line 16—16 in Fig. 15.

Figure 1:
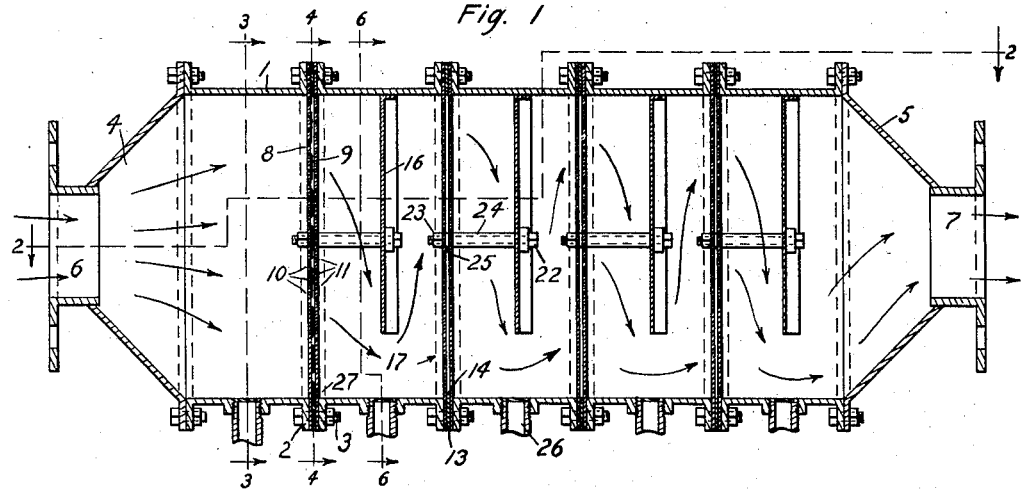
Figure 2:
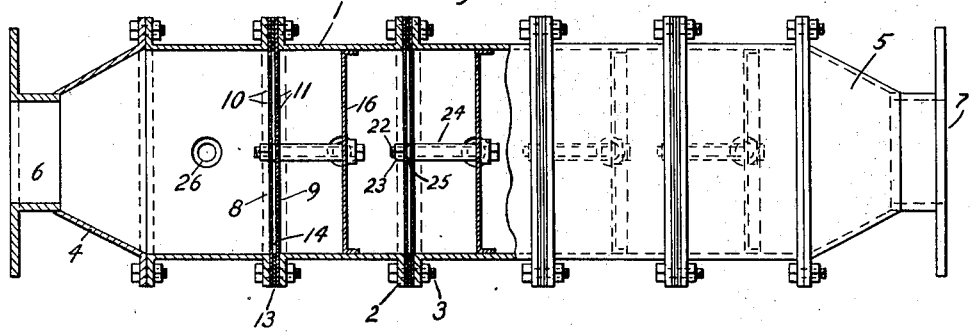

The form of my invention shown in Figs. 1 to 6 comprises a casing or housing which may be formed in a plurality of sections 1 removably fastened together, each section having flanges 2 whereby it may be secured to adjacent sections by means of bolts 3 passing through said flanges. End members 4 and 5 are secured to the flanges of the end sections 1, being flanged to receive the fastening bolts 3, end member 4 being provided with inlet means 6 for the gas to be cleaned, and end member 5 being provided with outlet means 7 for the cleaned gas.

The scrubbing means proper consists of scrubber plates 8 and 9 which extend transversely of the casing and are provided with perforations to permit the passage of gas therethrough. A series or plurality of sets of scrubber plates is preferably provided, each set consisting preferably of two plates, namely, a first plate 8 having perforations 10 presenting a relatively small total area so as to provide for restricted passage and correspondingly high velocity of the gas passing therethrough, and a second plate 9 having openings 11 presenting a larger total area so as to provide for relatively small pressure drop of the gas in passing through said second plate. The perforations in the second plate are staggered or arranged out of line with the perforations in the first plate.

In order to facilitate assembling the parts, the respective sets of scrubber plates are preferably interposed between successive sections 1 of the casing, the said scrubber plates extending beyond the walls of the casing and between the flanges 2 thereof and being provided with openings through which the bolts 3 pass, said bolts 3 also passing through openings in separator grid plates or frames 13 which are formed with openings 14 corresponding to the cross sectional area of the interior casing 1 so as to provide for proper spacing of the scrubber plates of each set, while permitting passage of the gas through the scrubber plates.

Figure 3:
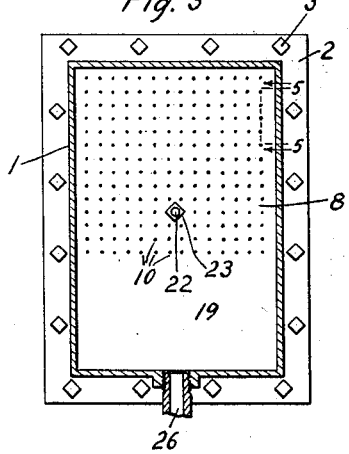
Figure 4:
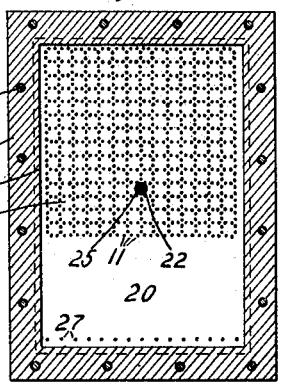
Figure 5:
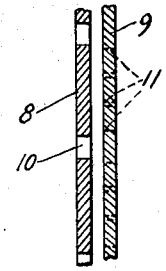

Following each set of scrubber plates is arranged an eliminating means formed for example as a baffle plate 16 which may be secured to the top of the corresponding section 1 and extend nearly to the bottom of such section, leaving an opening 17 near the bottom of the said section for the passage of the gases, the portion of the scrubber plates 8 and 9 which are opposite said opening 17 being blank or unperforated as shown at 19 and 20 in Figs. 3 and 4 respectively. Baffle plates 16 may be secured to their respective scrubber plates 8 and 9, by means of bolts 22 and nuts 23, sleeves 24 serving to properly space plates 9 from baffles 16, and washers 25 serving to properly space plates 8 and 9 from one another.

In order to provide for removal of collected liquid from each section 1, suitable means such as drain pipes 26 are provided, one of these drain pipes being connected at the bottom of each of said sections at any convenient place, for example near the center thereof. The scrubber is thus made up of a plurality of units connected in series, each of which comprises a set of scrubber plates, an eliminating means, and drain means.

The total area of the openings in the second scrubber plate 9 of each set may be made greater than in the first plate 8, for example by providing the second plate with a larger number of holes than the first plate, the diameter of each of said holes in the second plate being substantially equal to or greater than the diameter of the holes in the first plate. For example, the arrangement of the holes in the two plates of each set may be as shown in Figs. 3, 4, 5, and 7, there being four times as many holes 11 in the second plate 9 as there are holes 10 in the first plate 8, and said holes 10 and 11 being of substantially equal diameter, thus providing four times as great a total area for passage of gas through plate 9 as through plate 8. The holes 11 in plate 9 may be so arranged as to form an octagonal shaped group about the space opposite each hole 10 in plate 8 as shown in Fig. 7. While I do not wish to be limited to holes of a certain size or spacing or to a definite distance between plates 8 and 9, good results may be obtained with such an arrangement by making the holes $\frac{1}{16}$ to $\frac{1}{8}$ inch in diameter, spacing the holes in plate 8 from $\frac{1}{4}$ to $\frac{1}{2}$ inch apart and those in plate 9 correspondingly, and spacing plates 8 and 9 from $\frac{1}{16}$ to $\frac{1}{8}$ inch apart.

As shown in Fig. 8, the holes 11 in plate 9 may be arranged in hexagonally shaped groups about the spaces opposite holes 10 in plate 8, such an arrangement as is shown providing three times as many holes in plate 9 as in plate 8. Furthermore, as shown, holes 11 in plate 9 may be larger than holes 10 in plate 8 if desired, so as to give the desired ratio between total area of openings in the two plates.

If desired the number of holes in the two plates 8 and 9 may be the same, as shown in Fig. 9, and in such cases it is preferred to make holes in plate 9 of considerably greater diameter than holes 10 in plate 8. For example, holes 10 may be $\frac{3}{32}$ inch in diameter, and holes 11, $\frac{1}{16}$ inch in diameter, thus providing four times as great a total area of openings in plate 9 as in plate 8. The holes are located alternately or out of line in the two plates, and it is desirable to have each hole 11 arranged opposite the central portion of the space between adjacent holes 10 in plate 8.

Another modification of the scrubber plates is shown in Figs. 10 and 11, in which the openings or perforations in plates 8 and 9 are formed as long slits instead of round holes. For example, said plates may be provided with a plurality of vertical slits throughout substantially the same area as is shown provided with holes in Figs. 3 and 4, the slits 10' in plate 8 being relatively narrow, say $\frac{1}{32}$ to $\frac{1}{16}$ inch in width and the slits 11' in plate 9 being of somewhat greater width say from $\frac{3}{32}$ to $\frac{3}{16}$ inch, and said slits being arranged alternately in the two plates and at any desired distance, say $\frac{1}{4}$ to $\frac{1}{2}$ inch, apart.

In the operation of the above described form of the invention, using any of the above forms of scrubber plates, the gases or vapors, containing the liquid particles or mist which it is desired to remove therefrom, are led in through inlet 6, and pass through the scrubber in the direction indicated by the arrows in Fig. 1, the clean gases leaving through exit 7. The gases may be caused to pass through the apparatus, for example, by means of a fan placed either before or after the scrubber and adapted to produce the pressure head necessary to give the desired velocity of passage of gas through the scrubber plates. Due to the small total area of the openings 10 in the first plate 8 of each unit, the gas stream is constricted and caused to pass therethrough at high velocity and to impinge at high velocity upon the spaces in plate 9 opposite said openings. The effect of this is to cause agglomeration or coalescence of the fine liquid particles so as to form larger particles which will more readily settle out of the gas stream. The gas and unagglomerated mist particles then pass through the openings 11 in plate 9, and the relatively large total area of said openings serves to permit a relatively free escape of the gases in this manner after impinging on said plate.

Some of the agglomerated liquid resulting from this scrubbing action will flow down between plates 8 and 9, and the latter is preferably provided with means near its lower edge, such as a row of holes 27, to permit such liquid to pass through into the following section.

A portion of the agglomerated liquid, however, is carried forward with the gas stream in the form of particles of larger size than the original mist particles, and the purpose of the baffle plate or eliminating means 16 is to deflect the gas toward the bottom of each section and to cause such particles to settle out in the section following the particular pair of scrubber plates in which they were formed by agglomeration. The liquid settling out in this manner as well as that collecting between plates 8 and 9 and passing through holes 27, may be drawn off through drain pipe 26, a liquid seal or other suitable means being provided at the outlet of said pipe to prevent escape of gas or entry of air therethrough.

The gases pass in similar manner through the successive units of the scrubber, with the result that substantially all the mist or liquid particles are removed, and the gas leaving the scrubber is substantially clean and free from suspended particles.

With the use of the above described form of eliminating means it is preferable to leave a blank or unperforated section at the bottom of the scrubber plates or agglomerating means as above stated, but by the use of other forms of eliminating means it is possible to provide perforations throughout the entire area of said scrubber plates and thus increase the capacity of the scrubber. For example as shown in Fig. 12 the eliminating means may comprise a main baffle plate 16 and an auxiliary baffle plate 30, said baffle plate 16 being constructed and supported in the manner above described and said auxiliary baffle plate 30 being placed in advance of the main baffle plate and secured to the bottom of the scrubber and extending upwardly therefrom. In this case the holes 10 in plate 8 and holes 11 in plate 9 may extend clear to the bottom of the scrubber and the gas passing through the lower holes is forced to take a tortuous path over baffle plate 30 and under baffle plate 16. Openings 31 may be provided near the lower edge of auxiliary baffle plate 30 to permit liquid collecting in front of said plate to pass through and be discharged through the drain means 26, said holes 31 being insufficient in size to permit material passage of the gas stream therethrough.

Another form of eliminating means which is very efficient is shown in Figs. 13 and 14 and comprises a plurality of vertical sharply corrugated strips 32 spaced say 1/8 inch, more or less, apart so as to cause the gas to pass between such strips or plates in a zigzag path. Said strips 32 may be secured together and supported in any suitable manner; for example, they may be secured together by means of tie-rods 33 passing through openings in lugs or ears 34 at the corners of said strips and through spacing washers 33' between said lugs, and may be held in place within the scrubber by means of supporting arms 35 engaging the corners of the scrubber casing and the adjoining baffle plates. In this case also the holes in plates 8 and 9 may extend to the bottom of the casing and said plates may be held together by means of bolts 22, washers 25, and nuts 23. In this form of the invention the gas passing through the scrubber plates and carrying some of the agglomerated liquid particles in suspension is caused to pass through the tortuous or zigzag spaces between the strips 32, and the changes of direction and impact against said strips cause such agglomerated particles to collect thereon, and such collecting liquid settles to the bottom of the scrubber casing and is drained out through drain pipes 26.

As shown in Figs. 15 and 16, the eliminating means may comprise a pair of baffle plates 37 and 37' provided with a plurality of alternately spaced vertical slits 38 and having the edges of the plates adjacent said slits turned inwardly to form flanges 39 so as to form angular pockets in the space between said plates. Said slits 38 may extend substantially from top to bottom of said plates leaving solid strips at the top and bottom so as to give sufficient strength to maintain the plates in proper position. Auxiliary openings 40 may be provided at the bottom of the plates for passage of collected liquid therethrough. The above form of eliminating means also permits the openings or holes in plates 8 and 9 to extend to the bottom of the casing if desired. In this case the gases passing through the slits 38 in the first plate 37 impinge against solid portions of the second plate 37' and are then deflected and pass around and between the flanges 39 in the two plates and out through the opening 38 in the second plate. The agglomerated liquid particles contained in the gases as a result of the agglomerating action of the scrubber plates are caused to collect between said plates 37 and 37' and to flow down the surface thereof to the bottom of the casing and thus to the drain means 26.

It may be seen therefore that in any case my improved gas scrubber comprises a plurality of similar units connected in series, and that in each unit the gases pass first through an agglomerating means in which the fine mist particles are given a high velocity and made to impinge against flat surfaces, and are thus caused to coalesce and form larger particles which are adapted to more readily settle out, and then through an eliminating means in which said larger particles are separated and caused to settle to the bottom of the scrubber, whence they are removed by the draining means with which each unit is provided. An advantage of such a construction is that the particles which have been agglomerated are not required to pass through the small opening in the succeeding plates or agglomerating means, thus permitting such succeeding agglomerating means to act with the utmost efficiency upon the remaining mist particles. In order to prevent confusion between the action and function of the agglomerating means and the eliminating means it should be stated that, although the gases are subjected to changes of direction and in some cases to impact in the eliminating means as well as in the agglomerating means, the velocities obtained by the gas and consequently by the suspended liquid particles are much higher in the agglomerating means than in the eliminating means, due to the much smaller total area for passage of gas through the first plate of the agglomerating means than is available for passage of gas through the eliminating means. The high velocity thus produced in the scrubbing means proper is essential to the agglomeration of the fine mist particles, but after agglomeration of such particles the larger particles formed may be easily removed by changes of direction of the gas stream and impact against solid surfaces, without necessitating the production of such high velocities. In order to obtain the most efficient cleaning of the gas without necessitating undue pressure drop in the scrubber, it is desirable to make the total area of perforations in the first plate 8 of each agglomerating means relatively small, so as to have the greater portion of the pressure drop occur in passage of the gas through such first or velocity-producing plates, and thus produce maximum velocity in the gases passing therethrough and impinging on the second or impact plates 9, and to then allow as free an escape of the gas through said second plate 9 as possible by reason of the greater total area of perforations therein. The total available area for passage of gas through the eliminating means is also large in comparison and the pressure drop therein is consequently also comparatively small.

It will be noted that, in any of the above-described forms of scrubber plates or agglomerating means, the perforations in the first plate are equally spaced throughout the perforated area thereof, the second plate presents solid or imperforate impact surfaces opposite the perforations in the first plate, upon which the gas and mist particles passing through said perforations impinge at high velocity causing such mist particles to coalesce, and the perforations in the second plate are uniformly and symmetrically arranged with respect to such impact surfaces, so that the gas and liquid particles after impinging thereon are permitted to escape with equal freedom, in either or any of two or more directions, through any of the adjacent perforations in the second plate. Such an arrangement is highly efficient in that it provides for uniform passage of gas and uniform conditions of velocity, impact, and freedom of escape of gas after such impact, through the perforated area of the agglomerating means. It will also be observed that by arranging the holes as shown in Fig. 7 or Fig. 8, so that the greater total area of openings in the second plate is secured in part at least by the provision of a greater number of openings than in the first plate, especially uniform and advantageous conditions are secured, due to the larger number of avenues of escape offered to the gas after impinging on any impact surface.

The above described scrubber may be used for the removal of any kind of mist or suspended liquid particles from gases; for example, it may be used to collect the acid mist carried over in the evaporation or concentration of sulfuric acid and in such cases it is of course necessary to form the casing sections, scrubber plates, eliminating means, etc., of suitable acid resistant material for example, of lead. Another useful application of the scrubber is in the collection of hydrocarbon mists carried over in petroleum refining or in gasoline absorption processes; for example, it may be placed in the exit from the absorption tower of an absorption plant in which gasoline is removed from natural gas by absorption in a suitable solvent, for the purpose of removing from the gases in said exit any finely divided particles of such solvent which may be carried over with the gases leaving the absorption tower.

The velocity at which it is necessary to pass the gas through the openings 10 in the first or velocity producing plate 8 of the agglomerating means may depend to some extent upon the size, character, and concentration of the mist particles to be removed but in general such velocity should be in excess of twenty feet per second and the efficiency of separation increases rapidly with increase in such velocity. The fan or other means used for drawing or forcing the gas through the scrubber may be so designed and regulated as to produce whatever velocity is desired. It will be also observed that any number of the above described units consisting of agglomerating and eliminating means may be connected in series, and the number so connected may be such as to give any desired reduction in concentration of mist in the gases passing therethrough. By providing a sufficient number of such units the concentration of mist in the exit gases may be made practically negligible.

What I claim is:

1. A gas scrubber comprising a plurality of separable units connected for passage of gas therethrough successively, each of said units comprising, first, housing means adapted to confine such gas; second, agglomerating means provided with a velocity-producing plate having openings of relatively small total area and an impact plate presenting surfaces opposite said openings in the velocity-producing plate and itself provided with openings adjacent said surfaces and of relatively large total area; third, eliminating means following said agglomerating means and adapted to cause a change in direction of flow of gas while presenting a relatively large total open area for passage of gas therethrough; and fourth, drain means for removal of liquid from the bottom of said unit.

2. A gas scrubber comprising a plurality of casing sections removably connected together for passage of gas therethrough successively, a plurality of agglomerating means each removably connected between successive casing sections, a plurality of baffle means each mounted within one of said casing sections; and a plurality of drain means each located at the bottom of one of said casing sections; each of said agglomerating means comprising two perforated plates, the perforations in the first plate having a relatively small total area, and the perforations in the second plate having a relatively large total area and being arranged out of line with the perforations in the first plate.

3. In a gas scrubber, the combination of a casing adapted for passage of gas therethrough, an agglomerating means within said casing and comprising two plates provided with perforations distributed throughout a portion of their area, the perforations in the plate through which the gas passes first having a relatively small total area, and the perforations in the second plate having a relatively large total area and being arranged out of line with the perforations in the first plate, an eliminating means comprising a baffle plate within said casing and adapted to partially obstruct the gas after passing through said agglomerating means, said baffle plate extending across a portion of said casing and opposite the entire perforated portion of the scrubber plates but leaving a gas passage opening of relatively large total area, and drain means at the bottom of said casing.

4. In a gas scrubber, two casing sections provided with cooperating flange means by which said sections may be connected together to form a casing for passage of gas through said sections in series, removable securing means engaging said flange means to secure said sections in such connected position, and agglomerating means comprising a pair of perforated plates and spacing means between said plates, said plates being adapted to extend entirely across and from top to bottom of said casing between said sections, and said plates and spacing means having portions cooperating with said flanges so as to be secured in position between said casing sections by said removable securing means.

5. A removable scrubber unit, comprising a casing section provided with end flanges for cooperating with similar flanges on adjacent parts of the scrubber for connection therewith, agglomerating means at one end of said casing section and having portions cooperating with the corresponding end flange, baffle means mounted within said casing section, and means independent of said casing for securing said agglomerating means to said baffle means for bracing said agglomerating means.

6. In a gas scrubber, an agglomerating means comprising a velocity producing plate and an impact plate, and separating means between said plates, said velocity producing plate being provided with openings uniformly spaced and presenting a relatively small total area for passage of gas therethrough, and said impact plate having imperforate impact surfaces opposite said openings in the velocity-producing plate and having a greater number of openings than said velocity-producing plate, and said openings in the impact plate being spaced symmetrically about said impact surfaces and presenting a relatively large total area for passage of gas therethrough.

7. In a gas scrubber, a unit adapted to be connected for passage of gas therethrough, and comprising, first, housing means adapted to confine such gas; second, agglomerating means comprising a velocity-producing plate having openings of relatively small total area and an impact plate presenting surfaces opposite said openings in the velocity-producing plate and itself provided with openings adjacent said surfaces and of relatively large total area; third, eliminating means directly following said agglomerating means and adapted to cause a change in direction of flow of gas, while leaving an opening for passage of gas of relatively large total area; and fourth, drain means for removal of liquid from the bottom of said unit.

In testimony whereof I have hereunto subscribed my name this 20th day of May, 1924.

EVALD ANDERSON.